Nov. 17, 1959 W. W. PHARIS 2,913,532

CONNECTOR CIRCUIT

Filed April 8, 1957 4 Sheets-Sheet 1

INVENTOR
W. W. PHARIS
BY Francis E. Blake
ATTORNEY

Nov. 17, 1959 W. W. PHARIS 2,913,532

CONNECTOR CIRCUIT

Filed April 8, 1957 4 Sheets-Sheet 2

Nov. 17, 1959 W. W. PHARIS 2,913,532

CONNECTOR CIRCUIT

Filed April 8, 1957 4 Sheets-Sheet 4

2,913,532

CONNECTOR CIRCUIT

William W. Pharis, Rochester, N.Y., assignor to General Dynamics Corporation, Rochester, N.Y., a corporation of Delaware Application April 8, 1957, Serial No. 651,358

7 Claims. (Cl. 179—18)

This invention relates to dial telephone systems and particularly to the internal arrangements of connector switch circuits for providing special operating features therein.

The object of the invention is the provision of means for discriminating between calls extended through such a connector from a local source and from a toll arrangement whereby the differing operating features used therein may be accommodated.

More specifically, the object of the invention is to provide means in a connector used for establishing both local and toll connections to differentiate between certain classes of local connections to the end that what may be termed free service may be provided when the said local calls are directed to certain predetermined destinations.

The present invention is embodied in a multi-purpose connector and consists broadly in the means for providing reverse battery supervision on all calls extended from toll and only on calls to selected destinations on local calls. Alternatively the present invention may be considered as a means in a connector circuit for rendering free service on calls directed to certain specified destinations such as official calls to personnel of the telephone company and other destinations where it is not wished to make a charge against the calling subscriber. Therefore the connector is provided with discriminating means which will render the conventional charging circuits operative only when calls are directed to destinations for which a charge is to be made.

The conventional arrangement in connector circuits is the provision of a calling bridge relay for supplying talking battery to a calling party over the incoming terminals of the connector. Conventionally, the connections between the windings of the calling bridge relay and the incoming terminals thread through the contacts of an answering bridge relay which supplies talking battery to a called subscriber over the outgoing terminals of the connector so that upon the answer of the called subscriber the polarity of the talking current to the calling subscriber is reversed.

This reverse battery supervision is always necessary when the call is extended from a toll board but is not necessary when the call comes from a local source except when the call is directed to certain classes of called subscribers.

In accordance with the present invention a special relay is provided which will invariably respond to a connection established from a toll selector and which will respond to connections established from a local selector only when such connections are directed to marked levels. This special relay also controls the connections between the calling bridge relay and the incoming terminals of the connector. The arrangement now is such that both the answering bridge relay and the said special relay must be operated to affect the reverse current supervision, whereas either one alone will have no such effect.

A feature of the invention is a multipurpose connector provided with a conventional reverse battery supervision means and having additional means for normally rendering it ineffective, such additional means constituting enabling means responsive to certain predetermined conditions, whereby reverse current supervision may be denied under given circumstances.

A feature of the invention is a circuit arrangement whereby neither the answering bridge relay nor the discriminating relay will effect reverse current supervision but only the two operating conjointly.

Another feature of the invention is a means for enabling a reverse current supervision circuit responsive in some cases to the origin of the call and in other cases to the destination of the call. Specifically, this discriminating relay will invariably respond to a call incoming from a toll operator's position and will also respond to a call incoming from a local source under given circumstances, that is, when such call is extended to a predetermined destination. By such an arrangement, wherein certain levels of the connector are left unmarked, free service may be provided.

Other features will appear hereinafter.

The drawings consist of four sheets having five figures as follows:

Figs. 1, 2, 3 and 4, when arranged as indicated in Fig. 5, constitute a schematic circuit diagram of a connector embodying the features of the present invention, and Fig. 5, placed on the same sheet with Fig. 3, is a block diagram showing how the four sheets of drawings containing Figs. 1, 2, 3 and 4 must be placed to constitute a complete schematic circuit diagram.

The principal functions of the connector of the present invention are:

(1) To provide connector service for both local and toll connections.

(2) To serve individual called lines.

(3) To provide for consecutive number and level hunting.

(4) To provide for controlled ring and re-ring of a called line.

(5) To provide for toll marking by a resistance ground forwarded on the HS lead from the preceding circuit to operate the ring trip relay during the first digit.

(6) To provide for a direct ground return signal on the HS lead if the called line or all the lines of a P.B.X group are busy.

(7) To provide for the transmission of a busy tone through a winding of a battery supply relay.

(8) To provide for the seizure of the called line after the second digit if that line is free.

(9) To provide for the start of a trunk hunting operation after the second digit if the called line is the first line of a P.B.X group and is busy.

(10) To provide for the immediate start of ringing upon the seizure of a called line on calls from local or inter-toll.

(11) To provide for the registration of a ring start signal on calls from toll during trunk hunting.

(12) To provide means to allow the toll operator to start ringing or to re-ring after seizure.

(13) To provide for release either under the control of the calling subscriber alone or alternatively under control of the last party to release.

(14) To provide for reverse battery signaling to the calling party on marked levels only on local calls and on all calls from toll and inter-toll.

*Seizure—Local access*

When this circuit is seized by a local selector shown in Fig. 1, a bridge provided by the calling subscriber will be connected to the T and R terminals and thus will cause current flow through both coils of the CB relay 1 and through the contacts of the AB relay 2. The CB relay operates and connects a ground through the normally closed springs 4 of the Z release magnet 5, to the winding of the slow release RD relay 6.

The RD relay 6 operates and connects ground to the master ground wire 7 and this ground is then extended through the X off normal contacts 8 and thence through the upper winding of the XD relay 9 to battery, through the Y off normal contacts 10 a back contact and armature of the HT relay 11 and thence through the upper winding of the YD relay 12 to battery and through the Y off normal contacts 13, an armature and back contact of the HT relay 11 and thence through the winding of the PD relay 14 to battery. The XD relay 9, the YD relay 12 and the PD relay 14 thus follow the operation of the RD relay 6. The RD relay 6 also closes a ground to the back sleeve lead to hold the preceding equipment and mark this circuit as busy to other calls. The RD relay extends the impulsing path from the back contacts of the CB relay 1, through contacts of the PD relay 14, contacts of the YD relay 12, locking contacts of the XD relay 9 and thence through the lower winding of the XD relay to battery so that this relay may be held operated during the dial train of the first digit after the X off normal contacts 8 open. In parallel with the lower winding of the XD relay 9, the dial pulses will be also transmitted over an armature and front contact of the YD relay 12, to the X magnet 16 which will move all the brushes (Fig. 2) of the connector switch a corresponding number of steps in the X direction. The RD relay also opens the RA lead through which the Z release magnet is finally operated. The RD relay 6 also extends ground over the lead 17 leading through an armature and back contact of the BT relay 18 to the lower winding of the SW relay 19, the other terminal of which is open at this time.

The operation of the PD relay 14 opens the forward S and HS leads for purposes which will appear shortly.

*Dialing the first digit*

On the first impulse of the dial, the tip and ring selector loop to the CB relay 1 is opened so that this relay restores momentarily, opens the circuit to the RD relay 6 and closes a circuit in parallel to the lower winding of the XD relay 9 and the X stepping magnet 16. The X magnet operates, moves the switch one step in the X direction, operating the X off normal contacts opening the master ground to the upper winding of the XD relay whereby this relay now depends on its slow releasing characteristics to remain operated during this first train of dial pulses. The operation of the XON contacts 20 places ground on the ST start lead to enable the various common circuits such as ringing and tone circuits. At the end of the first impulse the tip and ring loop to the CB relay is reclosed and this relay reoperates, closing a circuit to the RD relay and opening the impulsing circuit to the XD relay and the X magnet.

The XD relay and the RD relay remain operated during pulsing due to their slow releasing characteristics. The remainder of the train of dial impulses moves the switch in the X direction to the desired level. At the end of the train of dial impulses the tip and ring loop remains closed to the CB relay so that this relay and the RD relay remain operated but the circuit to the XD relay and the X magnet becomes opened and in a short interval the XD relay 9 restores and prepares an impulsing circuit in parallel to the lower winding of the YD relay 12 and the Y magnet 21.

*Dialing the second digit*

On the first impulse of the second digit, the selector tip and ring loop to the CB relay 1 is opened and this relay restores thereby opening the circuit to the RD relay 6 and closing the impulsing circuit in parallel to the YD relay 12 and the Y magnet 21. The Y magnet operates and moves the switch one step in the Y direction, operating the Y off normal contacts 10 to open the circuit the upper winding of the YD relay 12 leaving it hereafter dependent on the train of second digit pulses. At the end of the first impulse of the second series, the selector tip and ring loop is closed to operate the CB relay 1, whereby the circuit for the RD relay 6 is closed and the impulse circuit to the YD relay 12 and the Y magnet 21 is opened. The YD relay 12 and the RD relay 6 remain operated during dial pulsing due to their slow release characteristics. The remainder of the series of dial impulses moves the switch in the Y direction to the desired line.

At the end of the train of dial pulses the selector tip and ring loop remains closed, the CB relay 1 and the RD relay 6 remain steadily operated and the YD relay 12 and the Y magnet 21 release. Upon the release of the YD relay a circuit from the master ground 7 is closed through operated contacts of the PD relay 14 and the back contacts of YD relay 12 to the upper winding of the XD relay 9 whereupon this relay again operates and locks from a ground from the Y off normal contacts 10, its own operated contacts, and the back contacts of the YD relay.

The reoperation of the XD relay 9 opens the holding circuit of the PD relay 14 and this relay then restores opening the holding and operating circuits for the XD relay 9. However, after the PD relay 14 has released and before the XD relay can follow, there is an interval due to the slow releasing characteristics of the XD relay during which the BT relay 18 is connected through back contacts of XD relay 9 and back contacts of the PD relay 14 to the forward sleeve wiper S. Thus the called line circuit is tested for busy. A similar circuit through front contacts of the XD relay and back contacts of the PD relay is closed to connect the HT relay 11 to the forward HS wiper for purposes which will shortly appear.

*Busy line*

If the called line is busy, ground appearing on the S terminal operates the BT relay 18 and this relay connects an alternate ground to the back sleeve 15, and prepares a connection from the master ground wire 7 for itself effective upon the release of the XD relay. The BT relay opens the circuit to the lower winding of the SW relay 19.

The XD relay restores and connects ground to the selector HS lead from a front contact of the BT relay and establishes a circuit from the BT lead, a front contact of the BT relay, a back contact of the XD relay, a back contact of the SW relay 19, to the upper winding of the AB relay 2 whereby busy tone will be transmitted through the windings of the AB relay and the talking circuit condensers to the calling party. When the calling party hangs up the calling bridge CB relay 1 will release and the remainder of the circuit will follow in a normal manner to be more fully described hereinafter.

*Trunk hunting*

When the PD relay 14 restores at the end of the last digit it connects the HT relay 11 to the HS wiper of the switch during the slow release time of the XD relay. If the line to which the connector is driven is the first line of a P.B.X group, its HS terminal will be grounded so that the HT relay will operate and lock to the master ground lead 7. The HT prepares a circuit from the lower winding of the HA relay 23, the interrupter contacts 24 of the Y magnet, a front contact of the HT relay, to a contact pair of the BT relay and thence over a back contact of the SW relay 19, back contacts of the PD relay 14, back contacts of the YD relay 12, front contacts of the XD relay 9 to ground at the operated Y off normal contacts 10 whereby if the BT relay 18 operates during the slow releasing period of the XD relay the HA relay will respond.

If the first line of this group is busy, a ground on its sleeve will close a circuit to the BT relay. This relay operates and extends ground to the contacts 24 of the Y magnet whereupon the HA relay 23 is operated and the XD relay is held through its lower winding. The BT relay prepares a busy tone circuit to the calling subscriber but this is held open at this time by the XD relay. The BT relay also prepares its own holding circuit, again dependent on the XD relay. The HA relay in operating locks at this time to the HS wiper until the switch has moved off this set of terminals. The HA relay closes a circuit from the Y magnet 21, front contacts of the HT and HA relays, a back contact of the LH relay 25 and a back contact of the YD relay 12 to the master ground wire 7. The Y magnet operates and steps the wipers to the next set of line terminals, operating the Y interrupter springs 24 to offer release to the HA relay 23 and the XD relay 9.

The BT relay is likewise offered release as the S wiper is moved from the grounded busy line sleeve terminal. The BT relay may release as the sleeve brush leaves the busy terminal and moves to the next but will immediately reoperate if the next line is busy.

The HA relay will release to open the circuit for the Y magnet and the operating circuit of the HA relay and the holding circuit of the XD relay is transferred to control of the BT relay. When the Y magnet restores to normal, the Y interrupter contacts 24 are closed so that if the BT relay is reoperated, the HA relay will be reoperated and the XD relay will be held. The HA relay reoperated will reoperate the Y magnet and thus the switch will step automatically until an idle line is found.

It may be noted at this time that the end of this group of lines is marked by a connection between the S and HS terminals such as the jumper 26 and that this may be on some other level. Therefore if the trunk hunting continues past the last terminal of the level where it started the overflow contacts will be operated, whereby the LH relay 25 will be operated from the master ground through the Y off normal contacts 10.

The level hunting LH relay 25 operates and closes a circuit from the Z release magnet 5, the X and the Y off normal contacts, a front contact of the LH relay, back contacts of the PD and YD relays and a front contact of the XD relay to the ground through the Y off normal contacts 10. The LH relay closes an alternate holding circuit for the RD relay 6 so that while the Z magnet springs 4 are opened, the RD relay will not release. The LH relay also prepares a circuit for the upper winding of the YD relay 12 which will be closed when the Y off normal contacts 10 are restored. Further, the LH relay 25 opens the impulsing circuit for the Y magnet and closes a holding circuit from the master ground wire 7 to the lower winding of the XD relay 9. The ground for the operation of the Z magnet 5 is also extended to the lower winding of the HA relay to hold this relay until the Y off normal contacts 10 are fully restored. The LH relay locks through the X magnet interrupter contacts 28 and closes a circuit for the X magnet through the resistor 29 whereby the X magnet will be sufficiently energized to prevent the release of the switch from its X position from which it will be advanced to another level upon the following operation of the YD relay.

The BT relay restores and the Z release magnet operates, releasing the switch in the Y direction. The operated Z magnet contacts 4 transfer the holding circuit for the RD relay to the ground supplied by the LH relay. When the switch returns to normal in the Y direction, the Y off normal and the overflow springs restore, opening the circuit to the Z release magnet and closing a circuit to the upper winding of the YD relay and a holding circuit to the upper winding of the XD relay. The Z magnet restores, restoring the Z magnet contacts 4 which recloses the original circuit to the RD relay 6.

The YD relay operates and this shunts the resistor 29 thus providing full energization for the X magnet 16 which operates, steps the switch to the next level and releases the LH relay 25 by opening the X interrupter contacts 28.

The LH relay 25 restores and prepares part of the impulsing path to the Y magnet, opens the circuit to the YD relay and opens the circuit to the lower winding of the XD relay. The circuit for the X magnet 16 is opened and the busy test BT relay is again extended to the sleeve wiper.

The YD relay restores and recloses the circuit to the Y magnet and the lower winding of the XD relay. The Y magnet reoperates and moves the switch wipers one step in the Y direction to the first terminals of the level, operating the Y off normal contacts which opens the holding circuit for the upper winding of the XD relay, extends ground to the contacts of the BT relay and operates the Y magnet interrupter springs. Thus the circuit for the HA relay and the lower winding of the XD relay are opened.

The HA relay restores and opens the circuit for the Y magnet. The Y magnet restores and recloses the Y interrupter springs so that the HA relay and the XD relay are now placed under control of the busy test BT relay. This relay is connected to the sleeve wiper of the switch through operated contacts of the XD relay and will operate if the line is busy from ground appearing on the sleeve terminal.

Reoperation of the BT relay recloses a circuit to the HA relay and a circuit to maintain the XD relay operated and thus the foregoing sequence of operation will be continued as the switch steps over all the lines in a level group until an idle line is found, and transfers to the next level group for a repetition of the test or until the last line of the highest trunk hunting level is reached. If the switch fails to find an idle line in the P.B.X trunk hunting group and reaches the last step of the highest level, ground on the sleeve terminal is forwarded through resistor 30 to the HS terminal which results in the locking of the HA relay through its upper winding thus halting further hunting. The HA relay is held operated and holds the Y magnet energized, thus opening the circuit to the XD relay through the Y interrupter springs 24. The XD relay restores, opens the holding circuit to the HA relay, closes a holding circuit to the BT relay and connects busy tone to the upper winding of the AB relay as hereinbefore described.

If an idle line is found, the busy test BT relay fails to reoperate thus preventing the reoperation of the HA relay and releasing the XD relay. The XD relay restores and the circuit will continue to function in the following manner.

*Switch through and ringing*

When an idle line is found and the XD relay is allowed to release, the sleeve is transferred from a connection to the BT relay to a circuit for the lower winding of the switch through relay. Since the sleeve will have a resistance battery connection thereto, the lower winding of the SW relay will be energized in a circuit with ground connected by the RD relay to conductor 17. The SW relay immediately closes a locking circuit for itself through its upper winding, and its X armature to the master ground wire 7, and upon operation places a ground on the sleeve of the called line to mark it as busy. Ringback tone is connected through a contact of the SW relay and a back contact of the RT relay 31 to the ring of the line to transmit ringback tone to the calling subscriber. The generator lead is connected through the lower winding of the ringing trip RT relay 31, a back contact of the TL relay 32, a back contact of the RT relay 31 and a front contact of the SW relay to the ring brush of the switch and a ground is connected over a back contact of the RT relay and a front contact of the SW relay to the tip brush whereby the calling signal is transmitted to the called line. The RT relay does not operate at this time.

The SW relay 19, in operating, connects the X wiper 33 to the upper winding of the DS relay 3.

If the level dialed on the first digit is a level which is to provide reverse battery supervision on answering of local calls, ground present on the X wire bank by a connection 34 made thereto is transmitted through resistor 35 to the upper winding of the DS discriminating relay 3 and this relay will operate to render the subsequent operation of the AB relay effective. If the selected level is not characterized by a ground connection 34, then the DS relay will fail to operate and any subsequent operation of the AB relay will not affect the polarity of the battery current to the calling subscriber. Thus calls to official destinations may be given free service.

*Called party answers*

When the called party answers, the bridge thus placed on the called party tip and ring circuit increases the current flow in the lower winding of the RT relay and this relay operating its X contacts provides a locking path from the master ground wire 7 through its upper winding. The operation of the RT relay disconnects ringing current from the called line circuit, disconnects the ringback tone from the calling line circuit and cuts the talking path through to the called line. The called party is now in control of the AB relay 2 and the AB relay responds. If the DS relay 3 has been operated, the operation of the AB relay will reverse the polarity of the talking current to the calling line. If the DS relay has not been operated, then the operation of the AB relay will leave the polarity of the talking battery to the calling line undisturbed.

If the W wiring has been made, then an additional ground connection is made by the AB relay to the master ground wire 7 to provide for last party release.

*Release—Calling party disconnects first*

When the calling party disconnects the selector tip and ring loop, which controls the CB relay 1, is opened and and the CB relay restores and opens its circuit to the RD relay 6. The RD relay restores in a time interval measured by its slow releasing characteristics and removes its ground connection to the master ground wire 7. The AB relay, however, maintains this ground through the "W" wiring. The release of the RD relay removes ground from the back sleeve 15, to release the preceding switch train and the DS relay which may have been locked to that lead through its X contact.

Upon the restoration of the RD relay a connection from the master ground is made through an armature and back contact of the RD relay, a back contact and armature of the BT relay 18, to the upper winding of the XD relay 9, which now operates. The XD relay closes a circuit from the ground applied to the out sleeve wire through a back contact of the PD relay, a front contact of the XD relay, a back contact of the LH relay 25 and the winding of the BT relay 18 to battery to cause the reoperation of this relay.

The SW relay remains operated, locked to the master ground through its upper winding and its X contacts. The RT relay 31, likewise remains locked to the master ground through its upper winding and its X contacts.

Upon the reoperation of the BT relay the circuit for the upper winding of the XD relay is opened and this relay restores, but in restoring transfers the BT relay to its own locking circuit so that this busy test relay remains operated. The release of the XD relay also establishes a ground connection from a front contact of the BT relay to the HS lead for HS supervision (when the connection is from a toll selector).

The circuit is held in this condition with the HT, RT, BT and SW relays holding to the master ground, and with the back sleeve 15 held grounded by the BT relay.

When the called party disconnects, the loop to the AB relay is opened and this relay releases. The W wiring ground is removed from the master ground wire 7 thus allowing the SW relay to release, whereupon the RA ground is extended through a back contact of the SW relay and a back contact of the XD relay to operate the Z release magnet 5. The Z magnet operates to release the switch, the Z magnet contacts 4 acting to maintain a ground on the back sleeve 15 until the switch is fully restored. The SW relay in releasing opens the tip and ring connections to the called party and removes ground from the called party sleeve thus freeing that line for seizure in another connection.

The removal of ground from the master ground wire 7 allows the HT, BT and RT relays to restore. When the switch is fully restored, the X and the Y off normal contacts restore and open the circuit for the Z magnet whereupon this magnet releases and the circuit returns to normal.

*Called party disconnects first*

When the called party disconnects first, the loop to the AB relay is opened and this relay restores. The AB relay removes one ground to the master ground wire 7 if the W wiring has been provided. If the DS relay has been operated, then the release of the AB relay returns normal battery over the tip and ring toward the calling party. The circuit is held until the calling party disconnects.

When the calling party disconnects, the selector tip and ring loop to the CB relay is opened and this relay restores. Thus the circuit to the RD relay is opened and in a short interval measured by the slow releasing characteristics of this first slow relay, it restores. The release of the RD relay releases the master ground thus opening the holding circuits of the HT, RT and SW relays and these relays restore. The SW relay, in restoring, removes ground from the sleeve wiper thus releasing the called line. At the same time the RA ground is extended to the Z magnet 5 and the switch is restored to normal. During the operation of the Z magnet, the contacts 4 hold a ground on the back sleeve to hold the connector against seizure until the restoration of the switch is complete. When the brushes of the switch have returned to normal, the X and the Y off normal switches return to normal and the Z magnet is released. The back sleeve is freed of ground and the circuit, including the selectors through which this connector had been seized, is returned to normal.

If the W wiring is not used, the circuit will release when the calling party disconnects, in which case if the called party delays, his line will be picked up by a line finder as though he were making a call.

*Detailed description—Toll*

Figure 1:
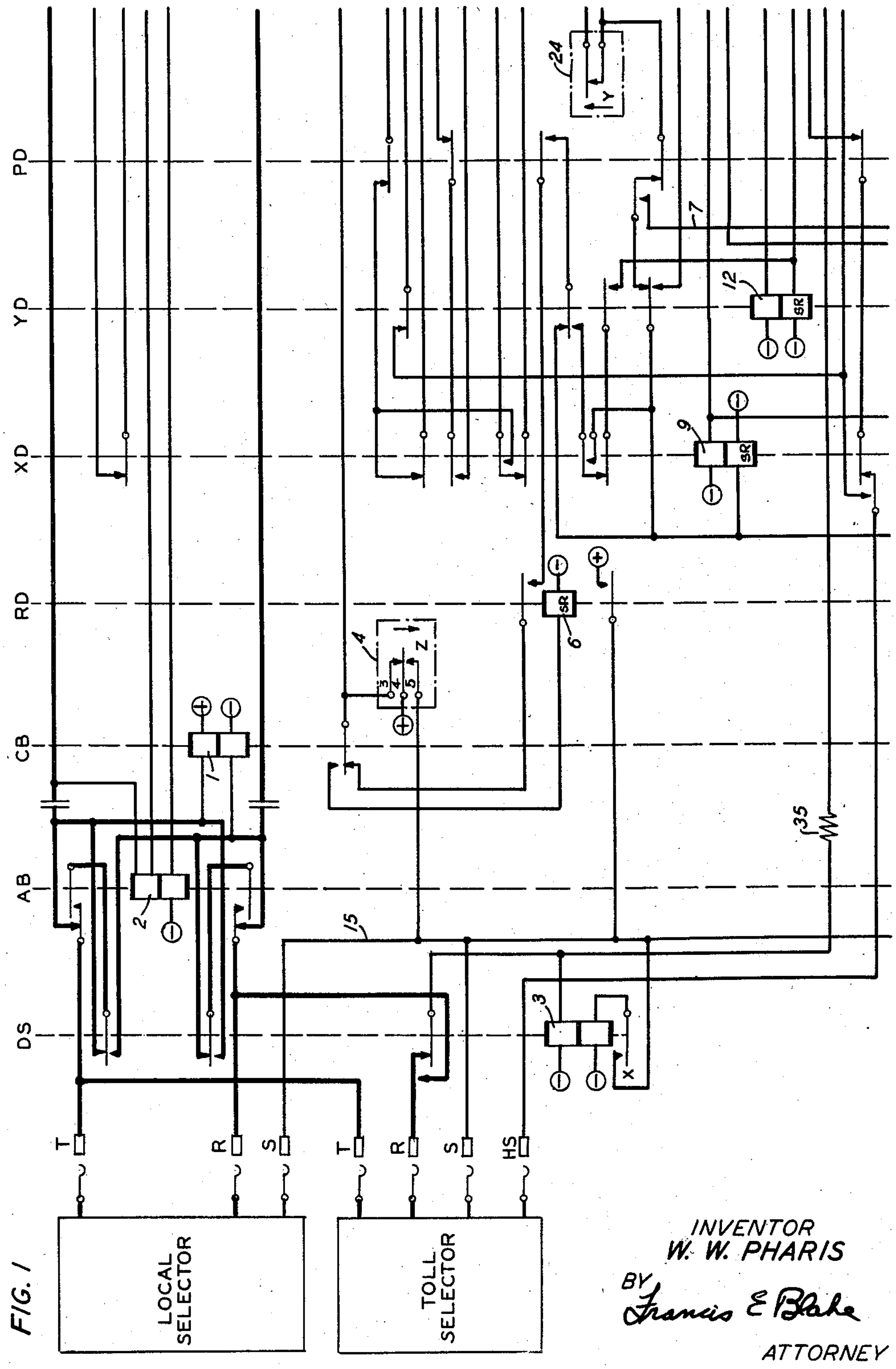
Figure 2:
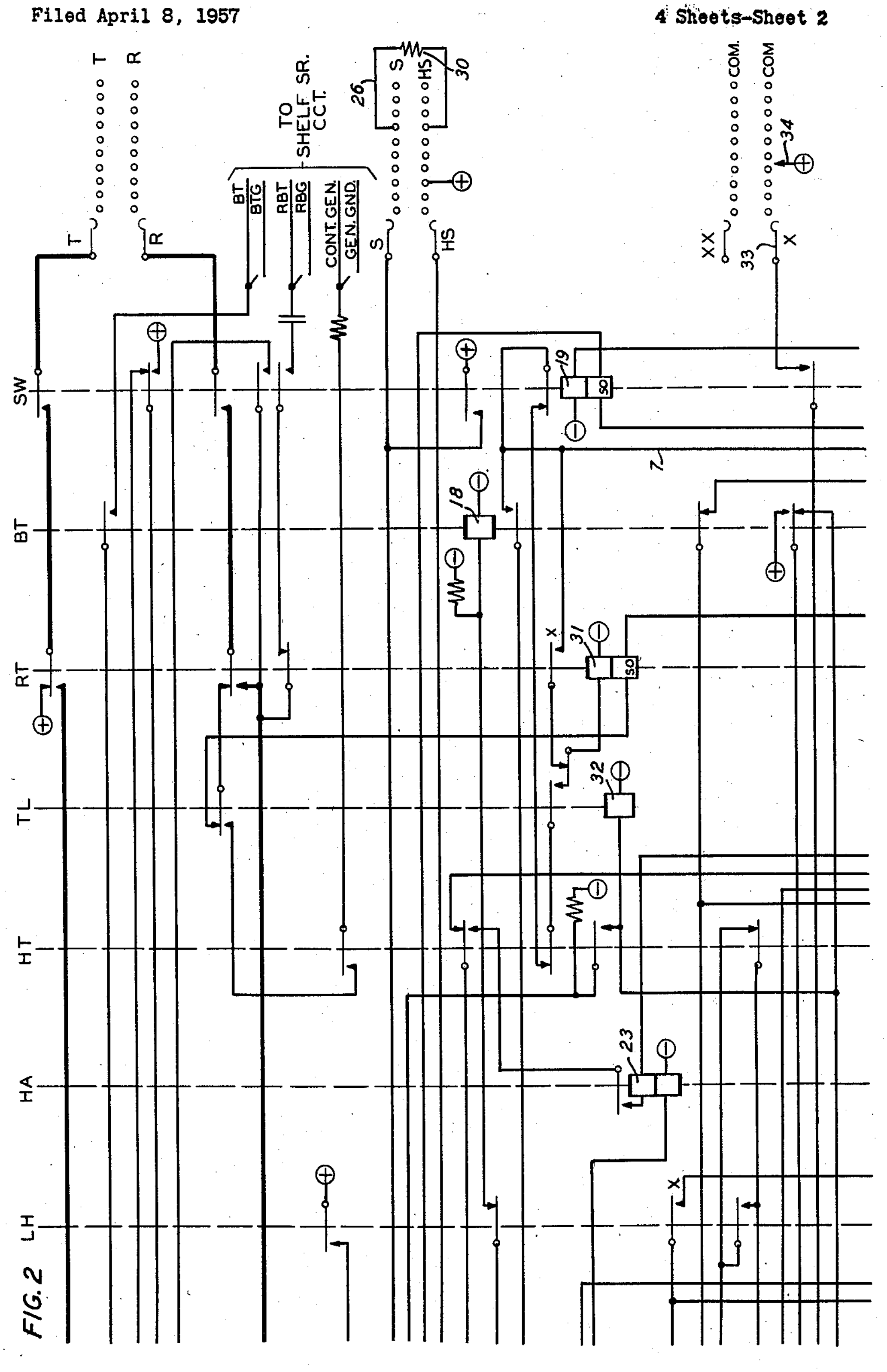
Figures 3, 5:
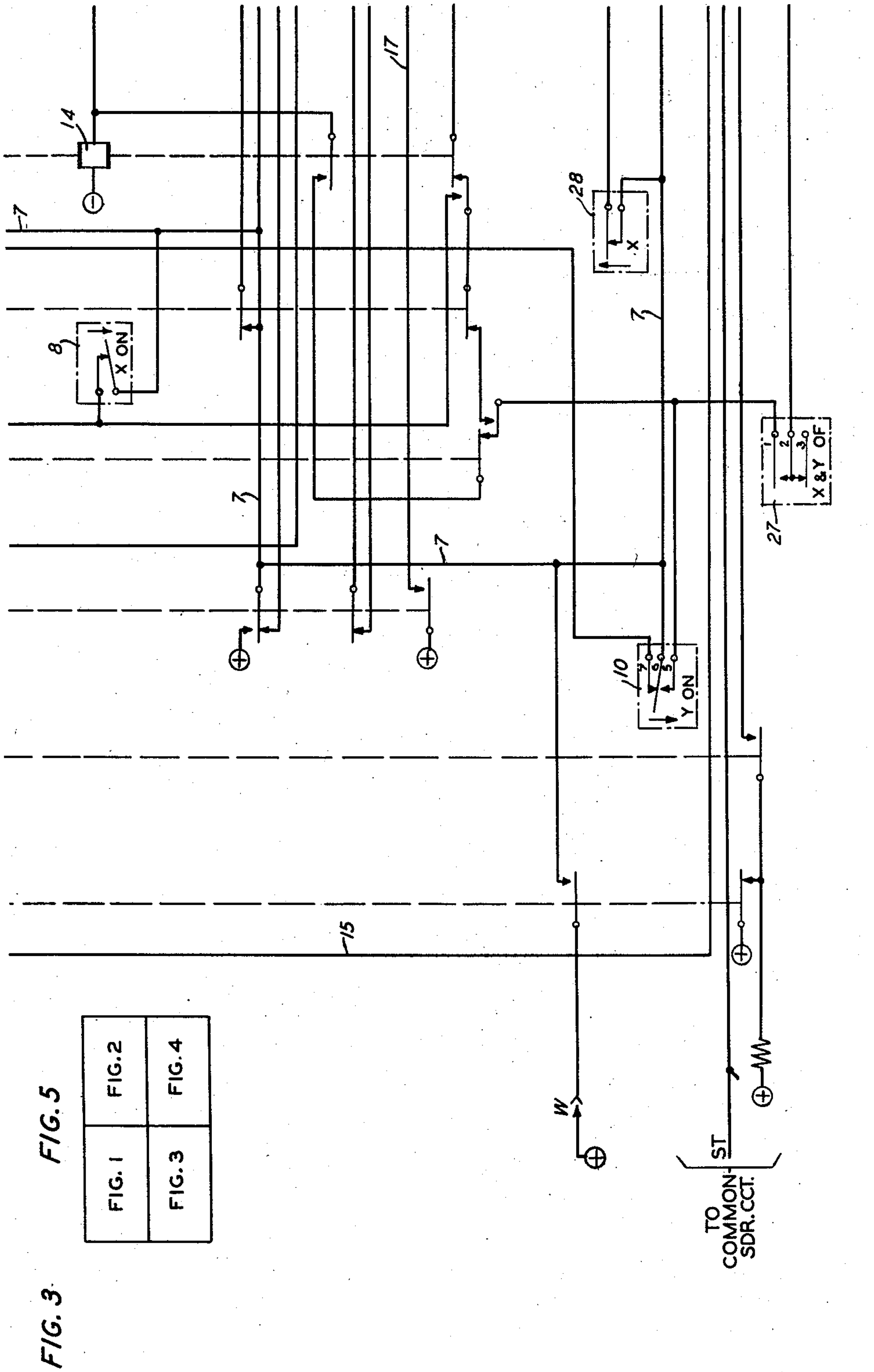
Figure 4:
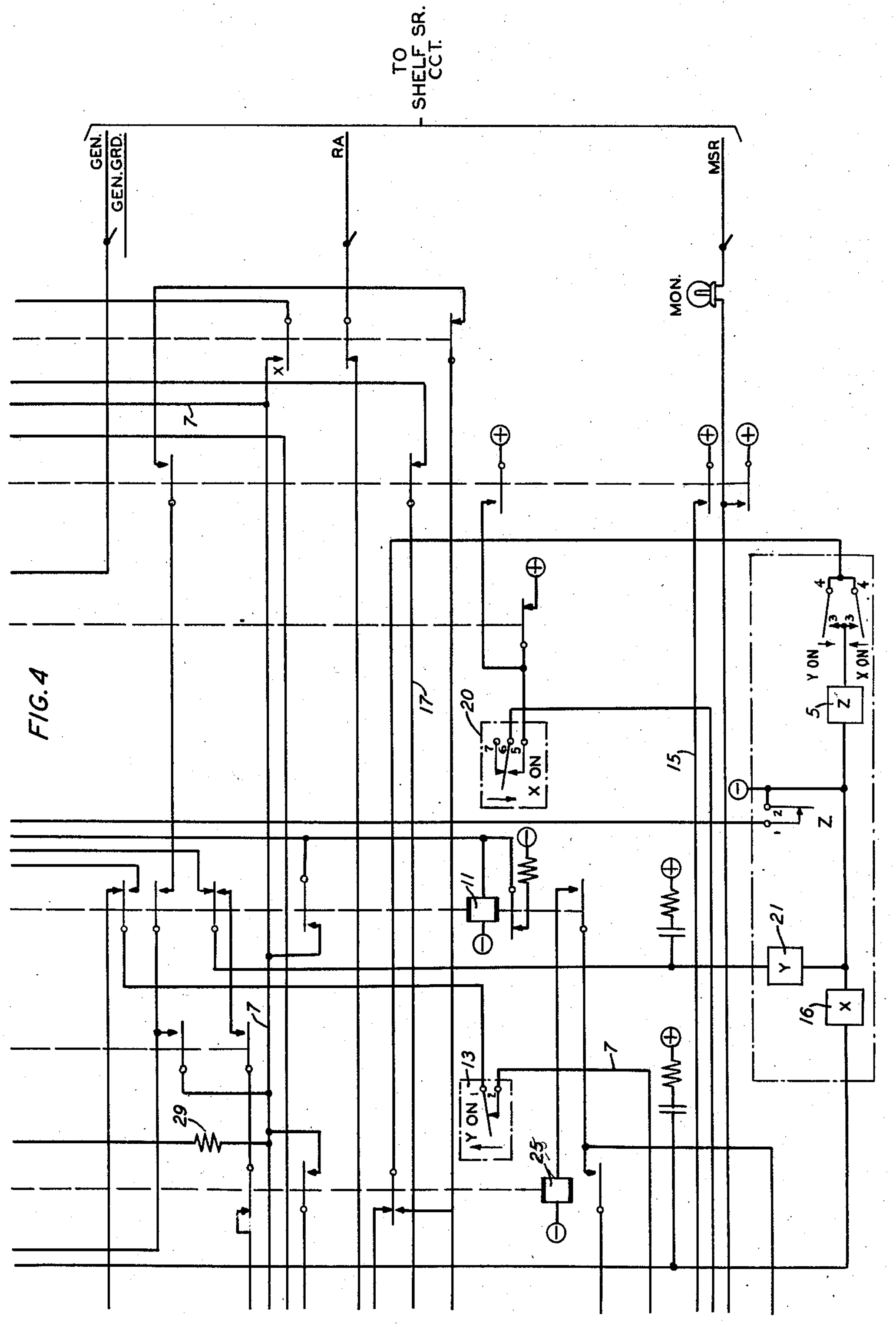

On a toll call this circuit will function as described hereinbefore except that during dialing a resistance ground is placed on the HS lead, allowing the TL relay 32 to operate. Also, the tip and ring loop is first closed through the upper winding of the DS relay 3 and the upper winding of the CB relay 1. Both these relays operate, the CB relay causing the operation of the RD relay and the DS relay operating its X contact and thus energizing its lower locking winding to fully operate all its armatures. The DS relay thus removes itself from the calling line loop circuit and switches the CB relay into complete control of this loop. The DS relay, in operating, prepares the circuit for the application of reverse battery supervision by the AB relay.

The TL relay 32 operates and opens part of a circuit for application of ringing current and closes a circuit from the master ground through a back contact of the SW relay to the upper winding of the RT relay to operate this relay.

Further operation of dialing is similar to that hereinbefore described for local access. Upon completion of dialing, resistance ground (in the toll selector) is removed from the HS lead and the TL relay releases. The RT relay remains locked through its upper winding.

After the second digit and during the release time of the XD relay, the BT relay is connected to the front sleeve wiper and the HT relay is connected to the HS wiper.

*Busy line—Toll*

The circuit functions as before described. Busy tone is returned over the tip and ring circuit and a direct ground is connected by the BT relay to the HS lead to give busy supervision to the calling line.

*Trunk hunting—Toll*

The circuit functions as hereinbefore described except that the operation of the HT relay 11 opens a holding path for the RT relay whereby this relay cannot hold when the TL relay is operated. The RT relay will remain operated until at some later time the TL relay is operated.

When the toll operator applies direct ground to the HS lead by her ringing key, the TL relay will respond and this will release the RT relay. Ringing takes place upon switch through in the manner previously described. This triggering of the ringing circuit may take place at any time, including the time the switch is level hunting.

*Re-ring*

When the operator wishes to re-ring a P.B.X line, she operates the ringing key again forwarding direct ground over the HS lead, operating the TL relay and releasing the RT relay. The RT relay restores and connects a source of continuous generator through operated contacts of the HT and TL relays, normal contacts of the RT relay and operated contacts of the SW relay to the called line. With the ring key normal the circuit is opened to the TL relay and thus on re-ring the ringing current is applied to the called line as by the operation of the ringing key. When the ringing key is restored and ground removed from the HS lead, the TL relay is restored and the RT relay has supervision of further ringing and will operate to trip the ringing on the answer of the called subscriber in the manner hereinbefore described.

*Switch through*

If the called line is idle, the XD relay on restoring after the second digit, closes a circuit from battery on the forward sleeve to the SW relay and this relay operates to function as hereinbefore described.

*Controlled ringing*

The operator may thus seize a called line and mark it as busy, withholding ringing by delaying the operation of the ring key until she wishes to signal the called party.

Should a party on a called line try to initiate a call during this delay period, the AB relay will operate and will signal the operator by the reverse battery supervision means. When the operator answers, conversation takes place between the called party trying to initiate a call and the toll operator. The AB relay restores when the subscriber disconnects and the circuit is returned to its seized condition. When the operator is ready, she operates her ringing key, grounds the HS lead, operates the TL relay and triggers the ringing circuit as before described.

What is claimed is:

1. In a connector circuit, a calling bridge relay for supplying talking battery to incoming terminals thereof, an answering bridge relay for supplying talking battery to outgoing terminals thereof, incoming terminals for said connector having two branches, one for seizure of said connector by local selectors and another for seizure of said connector by toll selectors, a third relay, means responsive to seizure of said connector by toll selectors for operating said third relay, a circuit network between said calling bridge relay and said incoming terminals controlled by said answering bridge relay and said third relay responsive to the conjoint operation thereof and unresponsive to the lone operation of either for reversing said battery feed connections to said incoming terminals whereby reverse battery supervision is provided in all connections extended to said connector over a toll selector.

2. In a connector circuit, a calling bridge relay for supplying talking battery to incoming terminals thereof, an answering bridge relay for supplying talking battery to outgoing terminals thereof, incoming terminals for said connector having two branches, one for seizure of said connector by local selectors and another for seizure of said connector by toll selectors, a third relay, means responsive to seizure of said connector by toll selectors for operating said third relay, a circuit network between said calling bridge relay and said incoming terminals controlled by said answering bridge relay and said third relay responsive to the conjoint operation thereof and unresponsive to the lone operation of either for reversing said battery feed connections to said incoming terminals and means for selectively marking groups of outgoing terminals with means for operating said third relay whereby reverse battery supervision is provided in all connections extended to said connector over a toll selector and in all connections extended by said connector to a terminal in a said marked group of terminals.

3. A connector circuit for both local and toll service having a set of local access incoming terminals and a set of toll access incoming terminals, a calling bridge relay having connection to said incoming terminals for supplying talking battery thereto, a switching relay connected to said toll access incoming terminals responsive to seizure of said terminals and having means responsive to said seizure to exclude itself from said terminals, said switching relay controlling a reverse battery supervisory circuit, an answering bridge relay for supplying talking battery to a set of connector outgoing terminals and means controlled by said answering bridge relay for inserting said reverse battery supervisory circuit in said connection between said calling bridge relay and said incoming terminals.

4. A connector circuit for both local and toll service having a set of local access incoming terminals and a set of toll access incoming terminals, a calling bridge relay having connection to said incoming terminals for supplying talking battery thereto, a switching relay connected to said toll access incoming terminals responsive to seizure of said terminals and having means responsive to said seizure to exclude itself from said terminals, said switching relay controlling a reverse battery supervisory circuit, an answering bridge relay for supplying talking battery to a set of connector outgoing terminals and means controlled by said answering bridge relay for inserting said reverse battery supervisory circuit in said connection between said calling bridge relay and said incoming terminals, said connector having a primary movement brush and a set of terminals each corresponding to a different group of lines, said switching relay being also connected to said brush whereby reverse battery supervision may be provided in local connections by the selective provision of marking on said primary movement brush terminals.

5. In a multipurpose connector a set of local access incoming terminals, a set of toll access incoming terminals, a toll access relay, a calling bridge relay normally connecting ground to the tip and battery to the ring of said incoming terminals, an answering bridge relay supplying talking battery to outgoing terminals of said connector, a circuit jointly controlled by said toll access relay and said answering bridge relay for reversing the battery supply by said calling bridge relay to said incoming terminals whereby reverse battery supervision may be extended on all connections made over said toll access incoming terminals.

6. In a multipurpose connector a set of local access incoming terminals, a set of toll access incoming terminals, a toll access relay, a calling bridge relay normally connecting ground to the tip and battery to the ring of said incoming terminals, an answering bridge relay supplying talking battery to outgoing terminals of said connector, a circuit jointly controlled by said toll access relay and said answering bridge relay for reversing the battery supply by said calling bridge relay to said incoming terminals whereby reverse battery supervision may be extended on all connections made over said toll acess incoming terminals and means individual to selected groups of outgoing terminals for operating said toll access relay whereby reverse battery supervision may also be extended to connections made over said local access incoming terminals when such connections are made to selected outgoing connections.

7. In a connector circuit, a calling bridge relay for supplying talking current to a calling subscriber over the incoming terminals thereof, an aswering bridge relay for supplying talking current to a called subscriber over the outgoing terminals thereof, current reversing contacts controlled by said answering bridge relay operative for reversing the direction of current flow to said calling subscriber, and means including contacts on a discriminating relay operative in response to the seizure of said connector by said calling subscriber for effectively connecting said current reversing contacts between said calling bridge relay and the said incoming terminals of said connector.

References Cited in the file of this patent

UNITED STATES PATENTS

| | | |
|---|---|---|
| 2,680,780 | Lomax | June 8, 1954 |
| 2,792,452 | Pharis | May 14, 1957 |